(No Model.) 3 Sheets—Sheet 2.
C. J. LUNDSTROM.
CENTRIFUGAL LIQUID SEPARATOR.
No. 571,838. Patented Nov. 24, 1896.
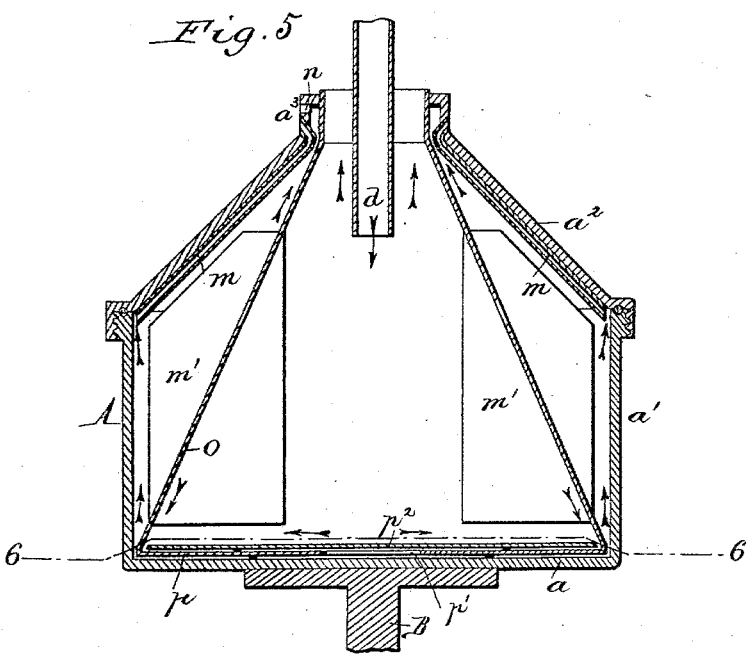
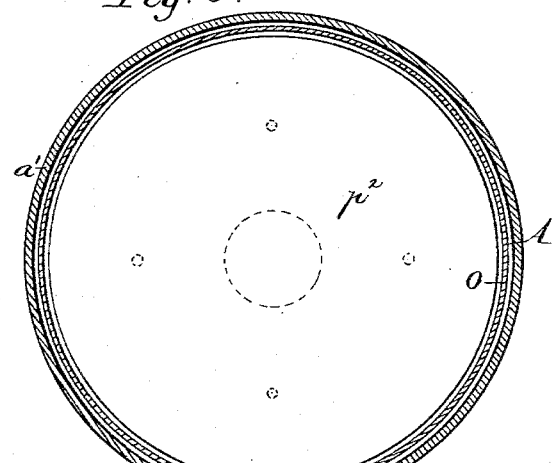
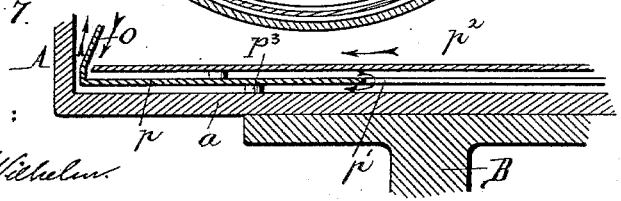

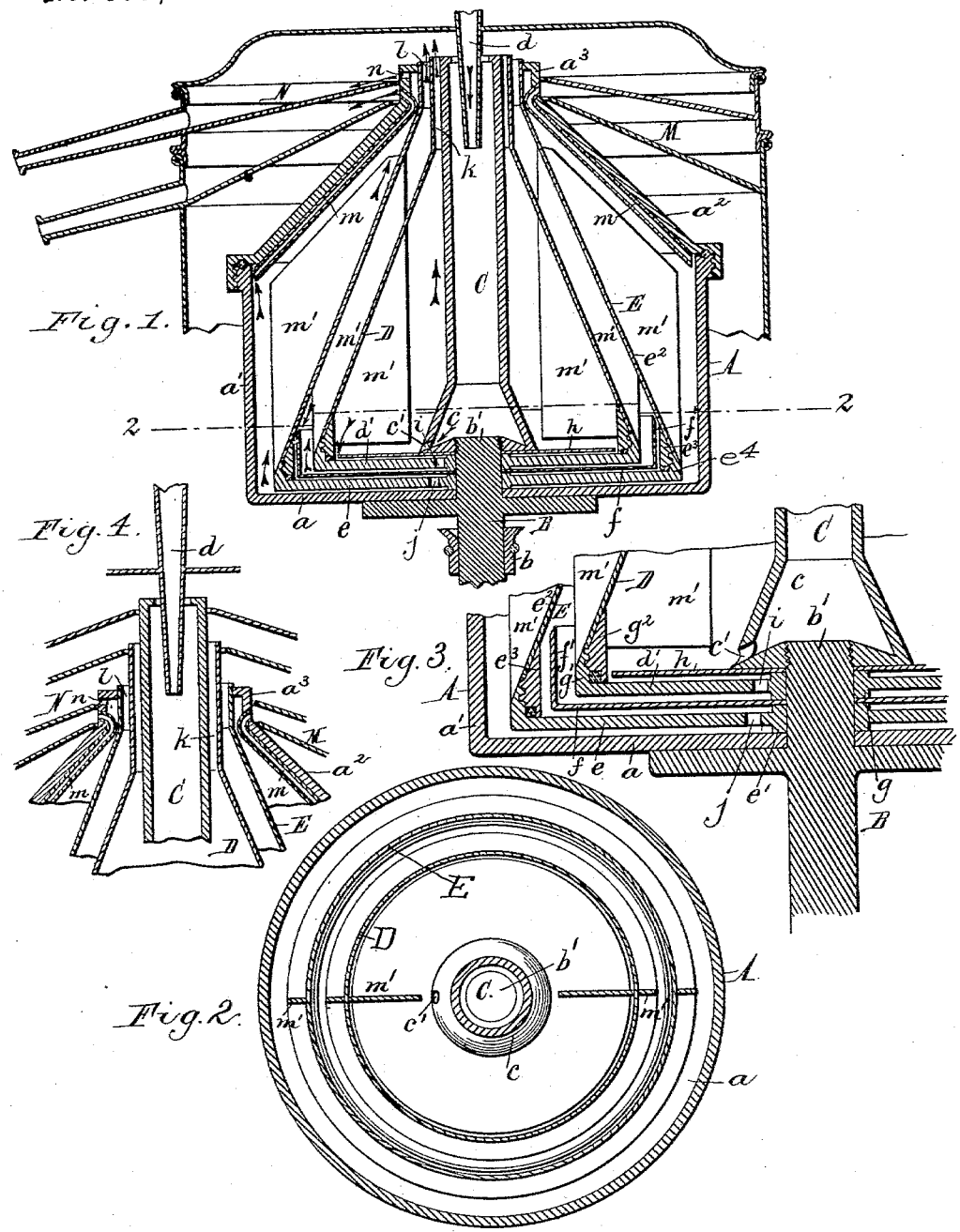

(No Model.) 3 Sheets—Sheet 3.
C. J. LUNDSTROM.
CENTRIFUGAL LIQUID SEPARATOR.

No. 571,838. Patented Nov. 24, 1896.

Witnesses:
F. Gustav Wilhelm.
Chas. F. Burkhardt.

Carl J. Lundstrom, Inventor.
By Wilhelm & Bonner
Attorneys

UNITED STATES PATENT OFFICE.

CARL JOHAN LUNDSTROM, OF LITTLE FALLS, NEW YORK, ASSIGNOR TO D. H. BURRELL & CO., OF SAME PLACE.

CENTRIFUGAL LIQUID-SEPARATOR.

SPECIFICATION forming part of Letters Patent No. 571,838, dated November 24, 1896.

Application filed March 16, 1893. Serial No. 466,272. (No model.)

*To all whom it may concern:*

Be it known that I, CARL JOHAN LUNDSTROM, a subject of the King of Sweden and Norway, residing at Little Falls, in the county of Herkimer and State of New York, have invented new and useful Improvements in Centrifugal Liquid-Separators, of which the following is a specification.

This invention relates to that class of centrifugal separating-machines which are employed for separating a compound liquid or emulsion into its constituent liquids of different densities, particularly for separating full milk into cream and skim-milk.

The object of this invention is to increase the separating capacity of this class of machines by simple means.

Figure 8:
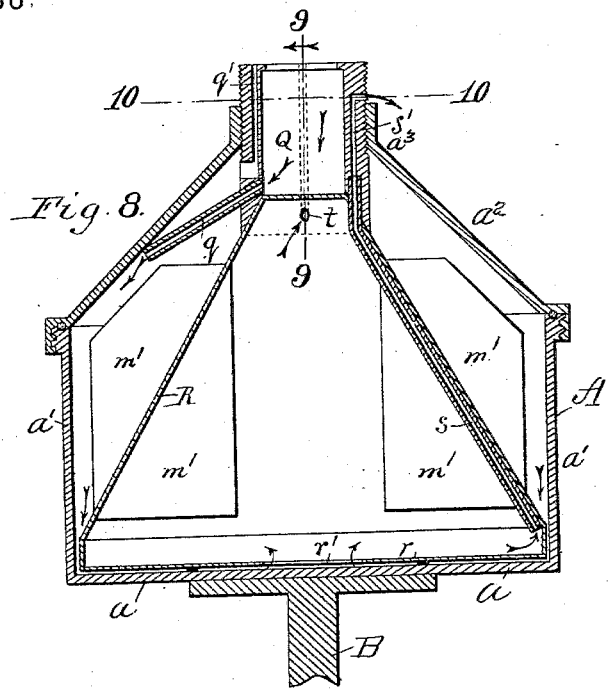
Figure 9:
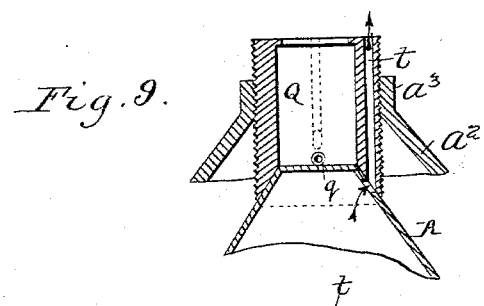
Figure 10:
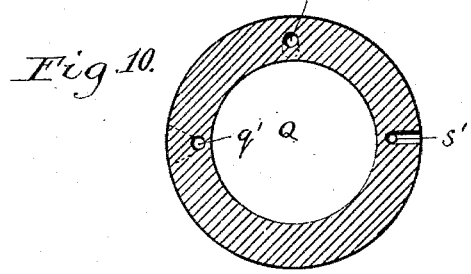

In the accompanying drawings, consisting of three sheets, Figure 1 is a sectional elevation of a centrifugal liquid-separator provided with my improvements. Fig. 2 is a horizontal section in line 2 2, Fig. 1. Fig. 3 is a fragmentary vertical section of the lower portion of the separator on an enlarged scale. Fig. 4 is a fragmentary vertical section of the upper portion of this separator, showing the cream-discharges arranged at different elevations. Fig. 5 is a sectional elevation of a centrifugal liquid-separator provided with a single internal bowl instead of the two internal bowls which are represented in Figs. 1, 2, 3, and 4. Fig. 6 is a horizontal section in line 6 6, Fig. 5. Fig. 7 is a fragmentary vertical section of the lower portion of the separator represented in Fig. 5 on an enlarged scale. Fig. 8 is a sectional elevation of a centrifugal liquid-separator containing my improvement and arranged to receive the full milk in the outer bowl instead of the inner bowl, as in the separator represented in Figs. 1 to 7. Fig. 9 is a vertical section of the upper portion of this separator in line 9 9, Fig. 8, the view being taken in the direction of the arrow crossing line 9 9 in Fig. 8. Fig. 10 is a horizontal section in line 10 10, Fig. 8, on an enlarged scale.

Like letters of reference refer to like parts in the several figures.

A represents the bowl or drum of a centrifugal liquid-separator, composed of a bottom $a$, peripheral wall $a'$, and a cover $a^2$, tapering upwardly to a contracted neck $a^3$.

B represents the spindle upon which the bowl is mounted, and $b$ the top bearing in which the spindle turns.

$b'$ is the neck of the spindle, which projects upwardly into the drum and is provided at its upper end with an external screw-thread.

C represents the feed-pipe, which is arranged axially in the drum and which is provided at its lower end with an enlargement or feed-cup $c$, having in its peripheral wall, near its bottom, a discharge-opening $c'$, through which the milk escapes, and in its bottom a screw-threaded opening by which the feed-pipe is secured to the upper screw-threaded end of the spindle.

$d$ represents a spout by which the milk is conducted from a feeder of any suitable construction into the feed-pipe C.

D and E represent two internal separating-bowls arranged concentrically within the outer bowl A, the bowl D being arranged within the bowl E. The primary internal bowl D is of less diameter than the supplemental internal bowl E and rests with its bottom upon the bottom of the latter, which in turn rests upon the bottom of the outer or main bowl, and both internal bowls are held down upon the bottom of the outer bowl by the feed-pipe C, the lower portion of which operates like a screw-nut in this respect. $d'$ and $e$ represent, respectively, the bottoms of these internal bowls.

The bottom $e$ of the supplemental internal bowl is provided on its under side and around its central opening with a shoulder $e'$, by which this bottom is supported at a short distance above the bottom $a$ of the outer or main bowl. The bottom $e$ is provided at its margin with an upwardly-projecting flange $e^4$, having an internal screw-thread, and the peripheral wall $e^2$ of the supplemental bowl is provided at its lower end with an externally-threaded flange $e^3$, by which it is secured to this bottom. The bottoms of the internal bowls are preferably made of cast-iron, while their peripheral walls are made of sheet metal.

$f$ represents a diaphragm which rests on a raised shoulder formed centrally on the bottom $e$ and extends outwardly nearly to the flange $e^3$. It is provided at its margin with an upwardly-projecting flange $f'$, which is separated from the flange $e^3$ by a narrow flow-passage.

The bottom of the primary internal drum is supported at a short distance above the diaphragm $f$ by a downwardly-projecting collar $g$ at its center and provided at its margin with a screw-threaded flange $g'$, to which the threaded flange $g^2$ of the peripheral wall of this drum is secured. A diaphragm $h$ is arranged at a short distance above the bottom $d'$ and is separated from the flange $g^2$ by a narrow flow-passage. The bottom $d'$ is provided near the spindle with an opening $i$, through which the skim-milk escapes into the supplemental internal bowl, and the bottom $e$ of the latter is provided with a similar opening $j$, through which the skim-milk escapes into the outer bowl.

The primary internal bowl D is provided at its upper end with a contracted neck $k$, which is arranged within the neck of the main bowl, and the supplemental bowl E is provided with a similar contracted neck $l$ of somewhat larger diameter and arranged around the neck of the primary bowl and within the neck of the main bowl.

$m$ represents the usual skim-milk pipes, which are secured to the cover of the outer bowl and which discharge the skim-milk from the latter into the usual receptacle M, surrounding the neck of the main bowl. $n$ represents the cream-discharge formed in the neck of the main bowl, and N the usual cream-receptacle surmounting the skim-milk receptacle M.

The internal bowls may be provided with internal wings $m'$ for compelling the milk to rotate with the bowls.

The full milk passes from the feed-pipe C into the primary internal bowl D, in which the primary separation is effected. The separated cream is discharged through the neck of this bowl into the cream-receptable N, and the partially-skimmed milk passes inwardly through the passage between the bottom $d'$ and the diaphragm $h$ of this bowl and escapes through the opening $i$ into the supplemental internal bowl E above the diaphragm $f$ thereof. This partially-skimmed milk is now further separated in the supplemental internal bowl, the cream passing off through the neck $l$ thereof, while the skim-milk passes inwardly between the diaphragm $f$ and the bottom $e$ of this bowl and escapes through the opening $j$ into the outer bowl, in which the final separation is effected. The cream separated in the outer bowl is discharged through the opening $n$, and the skim-milk is finally discharged through the skim-milk pipes $m$ into the receptacle M.

The flange $f'$, formed on the diaphragm $f$ of the supplemental internal bowl, prevents the skim-milk, in flowing downwardly into the space below the diaphragm, from commingling with the incoming milk, which is conducted by the base portion of the primary bowl very near the peripheral wall of the supplemental bowl.

In the construction represented in Fig. 1 the cream-discharges of the several bowls all open into the same receptacle; but, if desired, the cream-discharges may be arranged at different elevations, as represented in Fig. 4, so that each grade of cream can be collected in a different receptacle.

The full milk fed into the separator is subjected to a primary separation in the innermost bowl and the resulting cream is discharged from this bowl, while the partially-skimmed milk passes into the next outer bowl, where it is subjected to a further separation, the cream being discharged from this bowl, while the skimmed milk passes into the outer bowl, in which the final separation is made and from which the skimmed milk is finally discharged. These successive separations effect a complete skimming of the milk and greatly increase the capacity of the machine without increasing its size. The internal bowls are readily removed for cleaning the machine.

If desired, a single internal bowl may be employed, as represented in Figs. 5, 6, and 7. In this construction the internal bowl O rests with its bottom $p$ upon the bottom of the outer bowl. The bottom $p$ is supported by short feet $p^3$ at a short distance above the bottom of the outer bowl, and has a central opening $p'$ of the proper size to discharge the skimmed milk from the inner bowl into the outer bowl. At a short distance above the bottom of the inner bowl is arranged a diaphragm $p^2$, upon which the full milk is delivered by the feed-pipe and which extends nearly to the peripheral wall of the internal bowl.

The machine represented in Figs. 8, 9, and 10 is so organized that the milk is first separated in the outer bowl and the skimmed milk delivered to the inner bowl, in which the final separation is made. In this construction the outer bowl is provided in its neck with a feed-cup Q, which receives the milk to be separated and from which the milk is delivered into the upper portion of the outer bowl by a pipe $q$. This feed-cup is provided with a cream-discharge passage $q'$, the inlet of which is arranged in the surface of this feed-cup near the inner portion of the cover of the outer bowl and which extends upwardly in the wall of the feed-cup and discharges the cream at its upper end. The inner bowl R is supported with its bottom $r$ at a short distance above the bottom of the outer bowl, and this bottom is provided with a central opening $r'$, through which the skimmed milk from the outer bowl enters the inner bowl. The inner bowl is provided with a skim-milk-discharge pipe $s$, which communicates with an outlet-passage $s'$, formed in the wall of the feed-cup. The latter is also provided in its wall with a cream-discharge passage *t* for the inner bowl, which passage opens at its lower end into the inner bowl near the upper end thereof and opens outwardly at the top of the feed-cup.

I claim as my invention—

1. The combination with a rotating separating-bowl having a contracted neck, of an internal separating-bowl having its peripheral wall extending outwardly beyond said neck, one of said bowls being provided with an inlet for the full milk, with a discharge-conduit at the neck for the separated cream and with a discharge-conduit at the large end through which the partially-skimmed milk is conducted to the other bowl, which latter is provided with discharge-passages for the separated cream and skim-milk, substantially as set forth.

2. The combination with a rotating separating-bowl having outlets for the separated cream and skim-milk, of an internal tapering separating-bowl having its peripheral wall projecting outwardly beyond the zones of the outlets of the surrounding bowl and provided at its small end with an outlet for the separated cream and at its large end with a conduit for the escape of the partially-skimmed milk, which conduit extends inwardly from the peripheral wall of the inner bowl and discharges into the outer bowl, and a supply-conduit whereby the full milk is fed to the inner bowl, substantially as set forth.

3. The combination with a rotating separating-bowl provided at the top with a contracted neck and with outlets for the separated cream and skim-milk arranged therein, of an upwardly-tapering internal bowl having its peripheral wall projecting outwardly beyond the zones of the outlets of the surrounding bowl and provided at its upper end with an outlet for the separated cream, and at its bottom with a conduit for the escape of the partially-skimmed milk opening into the lower portion of the outer bowl, and a supply-conduit whereby the full milk is fed to the inner bowl, substantially as set forth.

4. The combination with an outer separating-bowl provided with a contracted neck having outlets for the separated cream and skim-milk, of a primary internal separating-bowl which first receives the milk to be separated, and a secondary internal separating-bowl in which said primary bowl is arranged and which is in turn arranged in said outer bowl, said secondary bowl being provided between its bottom and the bottom of the primary bowl with a diaphragm having an upturned marginal flange, substantially as set forth.

Witness my hand this 7th day of March, 1893.

CARL JOHAN LUNDSTROM.

Witnesses:
  GRIFFITH PRICHARD,
  HARVEY FELDMEIER.